United States Patent [19]

Yamada

[11] Patent Number: 5,025,673
[45] Date of Patent: Jun. 25, 1991

[54] CRANK CASE OF ENGINE FOR MOTOR-BICYCLE

[75] Inventor: Toshiyuki Yamada, Kosai, Japan

[73] Assignee: Suzuki Jidosha Kogyo Kabushiki Kaisha, Kamumura, Japan

[21] Appl. No.: 384,615

[22] Filed: Jul. 25, 1989

[30] Foreign Application Priority Data

Aug. 1, 1988 [JP] Japan .................. 63-192407

[51] Int. Cl.$^5$ .............. F16H 57/02; B62M 11/06
[52] U.S. Cl. .................. 74/337.5; 74/474; 74/606 R; 180/219
[58] Field of Search ........... 74/337.5, 473 R, 474, 74/606 R; 180/215, 219, 230

[56] References Cited

U.S. PATENT DOCUMENTS

| | | | |
|---|---|---|---|
| 4,339,964 | 7/1982 | Isaka | 180/219 X |
| 4,491,031 | 1/1985 | Doka | 74/474 X |
| 4,620,453 | 11/1986 | Kumazawa | 74/337.5 X |
| 4,754,662 | 7/1988 | Misawa | 74/337.5 X |

FOREIGN PATENT DOCUMENTS 62-1482 1/1987 Japan .
62-20935 1/1987 Japan .................. 74/337.5

Primary Examiner—Allan D. Herrmann
Attorney, Agent, or Firm—Schwartz & Weinrieb

[57] ABSTRACT

An engine of a motor-bicycle is provided with a crank case which includes a transmission chamber within which a transmission mechanism and a gear change mechanism are arranged. The gear change mechanism comprises first and second shift fork shafts, a gear shift cam shaft arranged between the first and second shift fork shafts, and a gear shift shaft operatively connected to the gear shift cam shaft. The first and second shift fork shafts and the gear shift cam shaft are disposed in within the transmission chamber and the gear shift shaft is disposed externally of the transmission chamber within a gear shift shaft chamber integrally formed with the crank case and fluidically separated from the transmission chamber.

7 Claims, 2 Drawing Sheets

CRANK CASE OF ENGINE FOR MOTOR-BICYCLE

FIELD OF THE INVENTION

This invention relates to a crank case of an engine for a motor-bicycle and, more particularly, to an improved structure of a transmission chamber defined within the crank case of a two-cycle engine for a motor-bicycle.

BACKGROUND OF THE INVENTION

The two-cycle engine of a motor-bicycle is generally provided with a crank case within which is defined a transmission chamber within which, in turn, a transmission mechanism and a gear change mechanism are accommodated.

With the crank case of the type described above, the transmission chamber is defined separately from a pre-loading chamber at a position behind the crank case. A transmission mechanism comprising a counter shaft and a drive shaft is arranged within the upper portion of the transmission chamber and a gear change mechanism comprising first and second shift fork shafts, a gear shift cam shaft located between the first and second shift fork shaft, and a gear shift shaft for operating the gear shift cam shaft is located within the lower portion of the transmission chamber.

With the crank case of the construction described above, substantially all of the whole constructional elements or members constituting the transmission mechanism and the gear change mechanism are accommodated within the transmission chamber. This means, in other words, that the transmission chamber occupies a relatively large space within the crank case, which results in the lowering of the rigidity of the crank case. The lowering of the rigidity of the crank case, in turn, results in an increase in the transfer of the vibrations from the engine itself.

In the meantime, the lubrication of the two-cycle engine of the motor-bicycle is generally carried out by means of a lubricating oil, that is, a transmission oil, stored within a clutch chamber and which is scattered by means of the rotation of a primary gear of a clutch into the transmission chamber by means of the so-called splashing lubrication method. According to such splashing lubrication method, however, it takes a considerable amount of time to increase the upper or surface level of the lubricating oil which has been scattered throughout the transmission chamber such that the level reaches a predetermined position, in the case where the transmission chamber has a large inner volume. Accordingly, in an adverse case, there may be caused a seizure of the variable speed gear of the gear change mechanism and the like due to oil starvation. This is a significant problem for the operation of the engine of the motor-bicycle.

OBJECTS OF THE INVENTION

An object of this invention is to substantially eliminate the defects or drawbacks encountered within the prior art described above and to provide a crank case of an engine for a motor-bicycle which has a reduced inner volume.

Another object of this invention is to provide a crank case of an engine for a motor-bicycle having an improved rigidity and including a transmission chamber within which a lubricatiting oil is speedily supplied in a short time.

SUMMARY OF THE INVENTION

These and other objects can be achieved according to this invention by providing a crank case of an engine for a motor-bicycle which includes a transmission chamber within which a transmission mechanism and a gear change mechanism are arranged, the gear change mechanism comprising first and second shift fork shafts, a gear shift cam shaft arranged between the first and second shift fork shafts, and a gear shift shaft operatively connected to the gear shift cam shaft, the crank case being characterized in that the first and second shift fork shafts and the gear shift cam shaft are disposed within the transmission chamber while the gear shift shaft is disposed externally of the transmission chamber within a separate gear shift shaft chamber.

In a preferred embodiment, the gear shift shaft is disposed within a gear shift shaft chamber which is formed integrally with the crank case.

According to the construction of the crank case defined above, the gear shift shaft of the gear change mechanism is arranged externally of the transmission chamber of the crank case, preferably within a chamber additionally provided upon the crank case, so that the inner volume of the transmission chamber is significantly reduced. The reduction of the inner volume of the transmission chamber can improve the rigidity of the crank case itself and, moreover, an increase in the surface level of the lubricating oil within the transmission chamber can be rapidly achieved, thus preventing the mechanism in the transmission chamber from seizing.

BRIEF DESCRIPTION OF THE DRAWINGS

The preferred embodiment will be described further in detail hereunder with reference to the accompanying drawings, in which like reference characters designate like or corresponding parts throughout the different views, and wherein.

DESCRIPTION OF THE PREFERRED EMBODIMENTS

For a better understanding of the present invention, the prior art technology will first be described hereunder with reference to FIG. 1 before the description of the preferred embodiment of the present invention.

Figure 1:
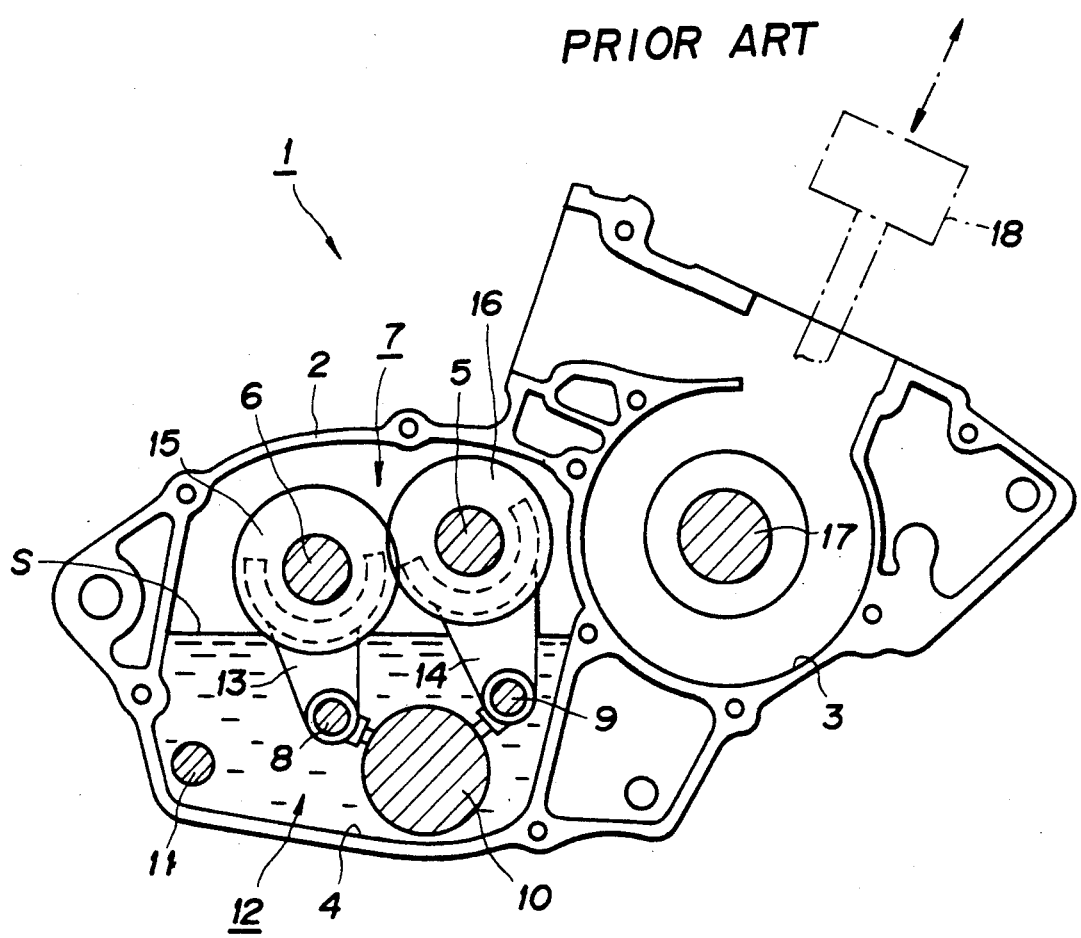
FIG. 1 is a sectional view showing a crank case of an engine for motor-bicycle according to conventional technology.

Referring to FIG. 1 showing the general arrangement of the constructional elements of a crank case of a two-cycle engine of a motor-bicycle, a transmission chamber 4 is defined separately from a pre-loading chamber 3 at a position behind the crank case 2 of a two-cycle engine 1. A transmission mechanism 7 comprising a counter shaft 5 and a drive shaft 6 is arranged within the upper portion of the transmission chamber 4. A gear change mechanism 12 comprising first and second shift fork shafts 8 and 9, a gear shift cam shaft 10 located between the first and second shift fork shafts 8 and 9 and a gear shift shaft 11 for operating the gear shift cam shaft 10 is located within a lower portion of the transmission chamber 4. Gear shift shaft 11 and gear shift cam shaft 10 are operatively connected to each other as schematically shown at 10-11. Referring to FIG. 1, reference numerals 13 and 14 designate shift forks of the gear change mechanism 12, reference numerals 15 and 16 designate variable speed gears, reference numeral 17 is a crank shaft and reference numeral 18 designates a piston.

With the crank case 2 of the construction described above, substantially all of the constructional elements or members constituting the transmission mechanism 7 and the gear change mechanism 12 are accommodated within the transmission chamber 4. This means, in other words, that the transmission chamber 4 occupies a relatively large space within the crank case 2, which results in the lowering of the rigidity of the crank case 2. The lowering of the rigidity of the crank case 2, in turn, results in an increase in the vibration of the engine itself.

In the meantime, the lubrication of the two-cycle engine of the motor-bicycle is generally carried out by means of a lubricating oil, that is, a transmission oil, stored within a clutch chamber which is scattered by means of the rotation of a primary gear of a clutch into the transmission chamber 4 by means of the so-called splashing lubrication method. According to such splashing lubrication method, however, it takes a considerable amount of time to increase the upper or surface level S of the lubricating oil scattered throughout the transmission chamber such that the level reaches the predetermined position throughout a case where the transmission chamber 4 has a large inner volume. Accordingly, in an adverse case, there may result a seizure of the variable speed gear and the like due to oil starvation. This is a significant problem for the operation of the engine of the motor-bicycle.

Figure 2:
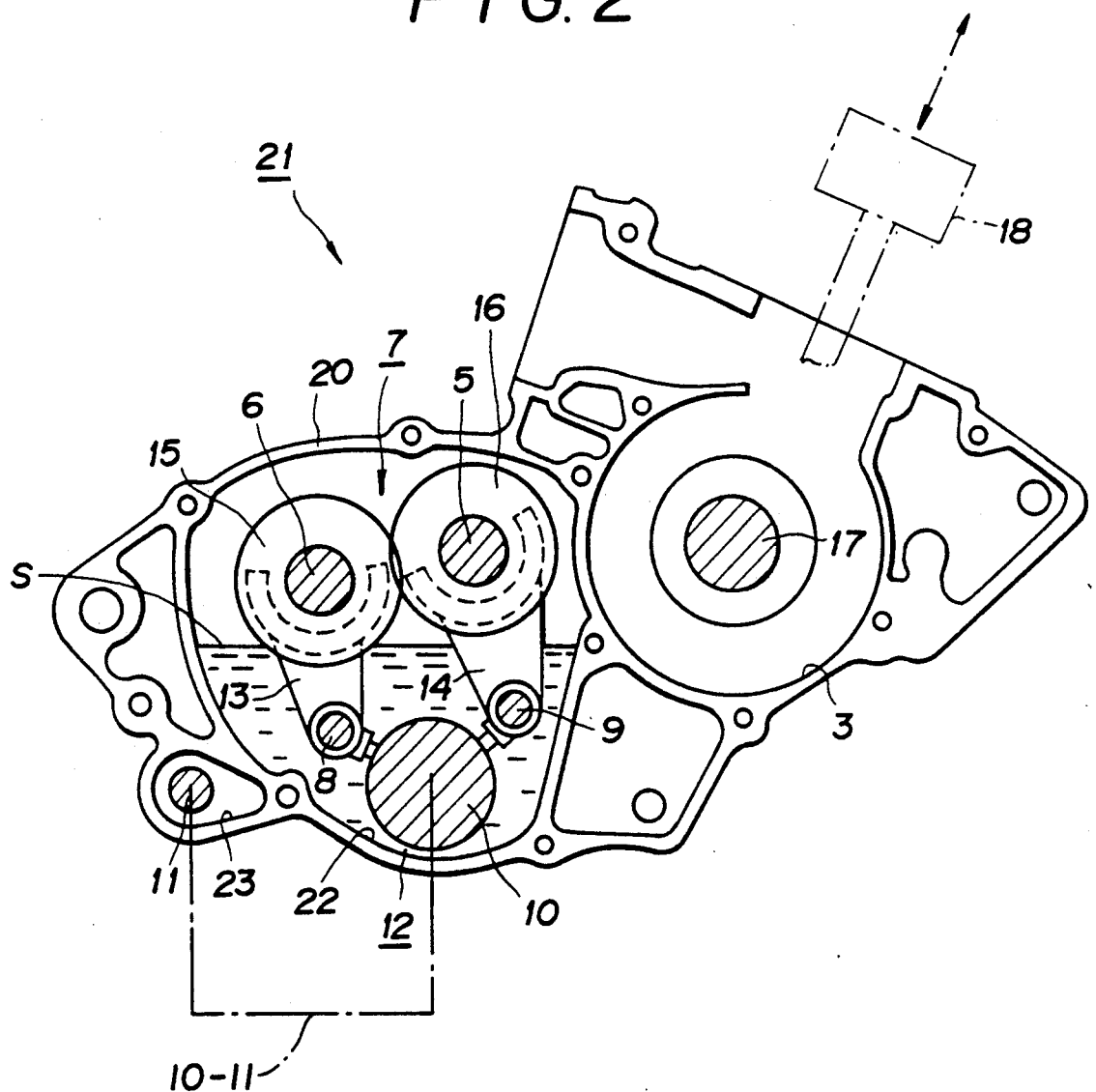
FIG. 2 is a sectional view showing a crank case of an engine for a motor-bicycle according to the present invention.

The present invention was conceived to substantially solve the problems encountered within the prior art described above and will be described hereunder with reference to FIG. 2, showing the general structure of a crank case 20 in which like reference numerals are added to elements or members corresponding to those shown in FIG. 1.

The crank case 20 shown in FIG. 2 represents that of a two-cycle engine of a motor-bicycle. As shown in FIG. 2, the crank case 20 is provided with a transmission chamber 22 within which is arranged a gear change mechanism 12 including a gear shift cam shaft 10 and a transmission mechanism 7 comprising a counter shaft 5 and a drive shaft 6.

With the crank case 20 shown in FIG. 2 of the embodiment according to the present invention, a gear shift shaft 11 of the gear change mechanism 12 is not disposed within the transmission chamber 22 because the gear shift shaft 11 is not directly connected to the gear shift cam shaft 10 and because it is not particularly necessary for the gear shift shaft 11 to be located within the lubricating oil. The gear shift shaft 11 is located in another chamber 23 additionally defined upon the crank case 20 at a position within which the gear shift shaft 11 is usually located. According to this construction, the gear shift shaft 11 is not arranged within the transmission chamber 22, so that the inner volume of the transmission chamber 22 is significantly reduced in comparison with the inner volume of the transmission chamber 4 shown in FIG. 1 of the conventional crank case 2 by means of the amount of the inner volume substantially corresponding to the inner volume of the gear shift shaft chamber 23. Accordingly, the crank case 20 can be made compact, thus being endowed with the desired rigidity.

The gear shift shaft 11 has one end to which a gear shift pedal, not shown, is secured and another end to which a shift cam drive gear, not shown, is secured and any other members such, for example gears are not connected to the intermediate portion of the gear shift shaft 11. Accordingly, even if the gear shift shaft 11 is independently disposed within the chamber 23, there is no obstacle to the operations and the functions of the transmission mechanism and the gear change mechanism.

In addition, according to this construction, the lubricating oil splashed by means of the rotation of the primary gear of the clutch within the transmission chamber 22 is stored therein within a short period of time and the surface level S of the splashed lubricating oil rises faster than that in the transmission chamber 4 shown in FIG. 1, whereby the seizure of the variable gear and other members can be effectively prevented.

The chamber 23 may be formed integrally with the crank case 20 by means of a molding process, for example, with no specific problem difficulties.

It is to be noted that this invention is not limited to the described embodiment and many other changes and modifications can be made without departing from the spirit and scope of the appended claims. For example, in the described embodiment, the gear shift shaft chamber 23 is additionally formed for accommodating the gear shift shaft 11 therein, but the chamber may be eliminated in a case where the gear shift shaft 11 is supported by any other means such as frange, for example member.

It is therefore to be understood that within the scope of the appended claims, the present invention may be practiced otherwise that as specifically described herein.

What is claimed is:

1. A crank case for an engine of a motor-cycle, comprising:
    a transmission chamber;
    a transmission mechanism disposed within said transmission chamber;
    a gear change mechanism, comprising first and second shift fork shafts and a gear shift cam shaft interconnecting said first and second shift fork shafts, disposed within said transmission chamber and operatively connected to said transmission mechanism;
    a gear shift shaft operatively connected to said gear shift cam shaft; and
    a gear shift shaft chamber, integrally formed with said crank case so as to be external to and fluidically separated from said transmission chamber, for housing said gear shift shaft.
2. A crank case as set forth in claim 1, wherein:
    said gear shift cam shaft is interposed between said first and second shift fork shafts.
3. A crank case as set forth in claim 1, wherein:
    said engine is a two-cycle engine.
4. A crank case as set forth in claim 1, wherein:
    said transmission mechanism comprises a drive shaft and a countershaft.
5. A crank case set forth in claim 1, wherein:
    said transmission mechanism comprises a plurality of variable speed gears.
6. A crank case set forth in claim 1, wherein:
    said transmission mechanism is disposed within an upper region of said transmission chamber.
7. A crank case set forth in claim 1, wherein:
    said gear change mechanism is disposed within a lower region of said transmission chamber.

* * * * *